Oct. 20, 1925.  
J. F. DAVIS  
FAUCET  
Filed Oct. 19, 1923  
1,558,245
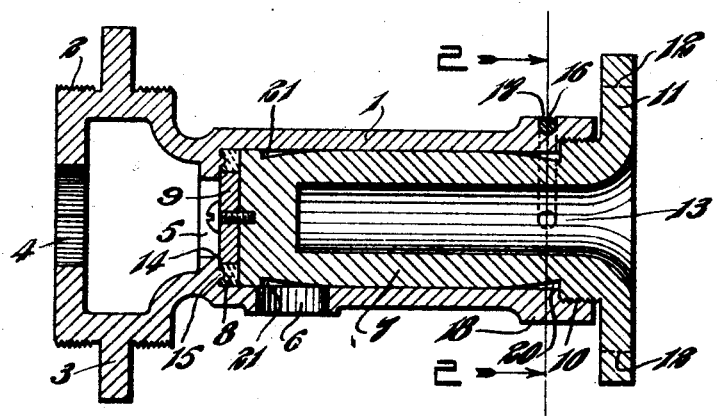
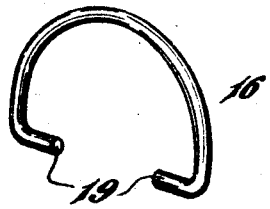
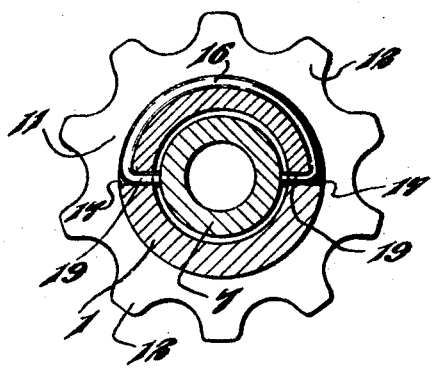
Inventor.
JOHN F. DAVIS.

Patented Oct. 20, 1925.

1,558,245

UNITED STATES PATENT OFFICE.

JOHN F. DAVIS, OF DECATUR, ILLINOIS.

FAUCET.

Application filed October 19, 1923. Serial No. 669,628.

*To all whom it may concern:*

Be it known that I, JOHN F. DAVIS, a citizen of the United States, and residing at Decatur, county of Macon, State of Illinois, have invented the new and useful Improvement in Faucets, of which the following is a specification.

This invention relates to faucets, and more particularly to such faucets as are used on barrels, casks and the like.

One of the objects of this invention is to provide a faucet which may be applied to barrels and similar vessels and which may be quickly opened or shut off and which will permit a free flow of the liquid from the vessel when opened.

Another object of this invention is to provide a faucet of simple construction, and one which will be durable and dependable in service and cheap to manufacture.

Further objects will appear from the detail description taken in connection with the accompanying drawing, in which:

Figure 1 is a central longitudinal section of a faucet embodying this invention;

Figure 2 is a section on line 2—2, Figure 1; and

Figure 3 is a perspective view of the valve retaining dog.

Referring to the accompanying drawing, 1 designates a casing, which is preferably of metal or other similar material, and is provided with a screw-thread 2 by which it may be screwed into a suitable socket in the barrel or cask to which it is applied. A flange 3 provides a stop which may abut against the cask when the faucet is screwed home. The casing is provided with ports 4, 5 and 6 through which a liquid may flow out when the faucet is opened. The casing is further bored to receive a cylindrical valve plug 7 which is adapted to slide longitudinally in the bore of the casing.

The end of the valve plug 7 may be provided with a gasket or packing 8 secured in place in any suitable manner as, for example, by means of a plate 9. The outer end of the valve plug 7 is provided with a threaded portion 10 adapted to engage a corresponding threaded socket in the casing. The valve is further provided at its outer end with a manipulative element or handle 11 having a rim provided with a series of notches or indentations 12 adapted to provide a secure hand hold. The valve plug 7 may have its interior cored out as shown at 13 so as to reduce the weight thereof and save material in its manufacture.

The valve 7 slides longitudinally in the bore of the casing 1. When withdrawn from its seat 14, the ports 5 and 6 will be opened and the contents of the cask allowed to flow out. When it is desired to close the ports, the valve is moved seatwise until the threads 10 engage the corresponding threads of the casing and is then rotated so as to force the gasket 8 firmly against the seat 14. If desired the seat may be provided with an annular bead 15 adapted to engage the gasket 8 so as to insure a perfect seal.

In order to prevent the withdrawal of the valve from the bore of the casing when opening the valve, a tensioned spring retaining clip or dog 16 is provided. This dog may be imbedded in a semi-annular recess 17 in the head 18. The ends 19 of the dog are bent inwardly as shown in Figure 3 and are adapted to project through diametrically opposite holes passing radially through the walls of the casing 1 at the terminals of the recess 17, as clearly shown in Figure 2. The valve 7 is provided with a pair of annular grooves 20 and 21, one near each end thereof. The groove 20 receives the ends 19 of the dog when the valve is in closed position and the groove 21 receives the ends 19 of the dog when the valve is drawn out to open the ports. The spring tension is such that the ends 19 bear with a light pressure on the bottom of the groove 20 when in the position of Figure 2. The recess 21 has one side beveled so that the tensioned dog will easily slide thereinto when the valve is retracted. The other side of the recess is radial so as to abut against the dog when the valve is retracted. Thus a stop is provided which prevents withdrawal of the valve. The recess 21 permits the dog to freely enter the same upon retractive movement of the valve and serves to limit that movement. At the same time a seatwise movement is permitted so that the valve may be closed. The recess 20 is beveled in the opposite direction so as to permit the dog to move thereinto so as to reduce the tension on the dog upon final seatwise movement of the valve and to move easily thereoutof on retractive movement of the valve.

It will be noted that this invention provides a simple and easily manipulative valve or faucet for casks or similar vessels. In opening it is only necessary to rotate the valve through a few revolutions to disengage the threads 10 and then retract the same to open the ports. The dog 16 prevents completely withdrawing the valve. In closing it is only necessary to move the valve forward until the threads 10 are engaged and then rotate the same to firmly seat the gasket and close the ports.

It is obvious that various changes may be made in details of construction without departing from the spirit of this invention; it is, therefore, to be understood that this invention is not to be limited to the specific details shown and described.

Having thus described the invention, what is claimed is:

1. A faucet, comprising, a casing having a port and having a bore terminating in a seat adjacent said port, a valve plug slidable in said bore and having an end face adapted to engage said seat, and a manipulative element on said plug, said plug having a threaded part adjacent said element cooperating with a threaded socket in said casing.

2. A faucet, comprising, a casing having a port and having a bore terminating in a seat adjacent said port, a valve plug slidable in said bore and having an end face adapted to engage said seat, a manipulative element on said plug, and a stop for limiting the withdrawal of said plug, said stop being yieldingly tensioned but retractable to permit withdrawal of said plug from said casing.

3. A faucet, comprising, a casing having a port and a bore, a valve plug slidable in said bore, a yieldingly tensioned stop for limiting the outward movement of said plug, and means for reducing the tension of said stop when said plug is in port closing position.

4. A faucet, comprising, a casing having a port and a bore, a valve plug slidable in said bore, a yieldingly tensioned stop bearing on said plug and adapted to limit the outward movement thereof, said plug having a recess for receiving the inner portion of said stop when said plug is in port closing position.

5. A faucet, comprising, a casing provided with a port, a valve provided with a manipulative element and adapted for sliding movement in said casing to seat said valve and for retraction to unseat said valve and open said port, and a spring stop adapted to prevent withdrawal of said valve from said casing.

6. A faucet, comprising, a casing provided with a port, a valve provided with a manipulative element and adapted for sliding movement in said casing to seat said valve and for retraction to unseat said valve and open said port, a recess in said valve and a spring stop adapted to engage in said recess to prevent withdrawal of said valve from said casing but to permit seatwise movement thereof.

7. A faucet, comprising, a casing provided with a port, a valve provided with a manipulative element and adapted for sliding movement in said casing toward its seat and to unseat said valve and open said port when retracted, means for cooperatively engaging said valve with said casing after the valve has been moved to a position near its seat to positively seat said valve by rotation thereof, an annular recess in said valve and a dog on said casing adapted to engage in said recess to limit retroactive movement of said valve but to permit seatwise movement thereof.

8. A faucet, comprising, a casing provided with a port, a valve provided with a manipulative element and adapted for sliding movement in said casing toward its seat and to unseat said valve and open said port when retracted, means for cooperatively engaging said valve with said casing after the valve has been moved to a position near its seat to positively seat said valve by rotation thereof, a beveled recess in said valve and a dog on said casing adapted to engage in said recess to limit retractive movement of said valve but to permit seatwise movement thereof.

In testimony whereof I affix my signature this 13th day of October, 1923.

JOHN F. DAVIS.